(12) United States Patent
Broussard

(10) Patent No.: US 6,865,733 B2
(45) Date of Patent: Mar. 8, 2005

(54) STANDARDIZED INTERFACE BETWEEN JAVA VIRTUAL MACHINE CLASSES AND A HOST OPERATING ENVIRONMENT

(75) Inventor: Scott J. Broussard, Cedar Park, TX (US)

(73) Assignee: International Business Machines Corp., Armonk, NY (US)

(*) Notice: Subject to any disclaimer, the term of this patent is extended or adjusted under 35 U.S.C. 154(b) by 425 days.

(21) Appl. No.: 09/885,995

(22) Filed: Jun. 21, 2001

(65) Prior Publication Data

US 2003/0110024 A1 Jun. 12, 2003

(51) Int. Cl.[7] ............................................. G06F 9/45
(52) U.S. Cl. .................. 717/147; 717/146; 717/148; 719/319; 719/328; 719/329
(58) Field of Search .................. 719/319, 328, 719/329; 717/146, 147, 148; 709/310; 370/254, 410

(56) References Cited

U.S. PATENT DOCUMENTS

| | | |
|---|---|---|
| 5,991,534 A | 11/1999 | Hamilton et al. |
| 6,003,050 A * | 12/1999 | Silver et al. ................ 715/536 |
| 6,011,916 A | 1/2000 | Moore et al. |
| 6,029,000 A | 2/2000 | Woolsey et al. |
| 6,064,382 A | 5/2000 | Diedrich et al. |
| 6,066,181 A * | 5/2000 | DeMaster ................... 717/148 |
| 6,083,276 A | 7/2000 | Davidson et al. |

OTHER PUBLICATIONS

S. Fouzi Husaini, Using The Java Native Interface, Jan. 25, 2001, The ACM's First Electronic Publication.*
Sun Microsystems, The AWT Native Interface, 1999, Sun Microsystems.*
David Curtis, Java, RMI and CORBA, 1997, Object Management Group.*
Sun Microsystems, Distributed Application Management using Jini Connection Technology, 2000, Sun Microsystems.□□.*
Sun Microsystems, Support for Extensions and Applications in the Version 1.2 of the Java Platform, 1998, Sun Microsystems.*

* cited by examiner

*Primary Examiner*—Nabil El-Hady
(74) *Attorney, Agent, or Firm*—Kevin L. Daffer; Conley Rose P.C.; Mark S. Walker, IBM (57) ABSTRACT

A system and method are disclosed for a host platform interface (HPI), which defines a common set of functions implementing the native methods of Component Peer classes within the Java AWT. This allows the diverse native method implementations currently used in different versions of the AWT to be combined into a single body of source code, greatly improving code maintainability. Since the same source code defines a Component Peer class for each supported platform, changes or bug fixes need only be made in one body of code.

15 Claims, 3 Drawing Sheets

STANDARDIZED INTERFACE BETWEEN JAVA VIRTUAL MACHINE CLASSES AND A HOST OPERATING ENVIRONMENT

RELATED APPLICATIONS

This application is related to the following U.S. patent application Ser. No. 09/886,002, filed on even date herewith, title "Java Classes Comprising an Application Program Interface for Platform Integration Derived from a Common Code base," by Scott J. Broussard, now U.S. Pat. No. 6,789,254, issued on Sep. 7, 2004.

BACKGROUND OF THE INVENTION

1. Field of the Invention

This invention relates to computer software, and more particularly, to a definition for a consistent interface for the native methods called by Component Peer classes within the abstract windowing toolkit (AWT), a software interface between platform independent Java applications and a particular hardware platform. This leads to a common set of Peer classes for all supported platforms, which can be ported without modification to heterogeneous computer systems.

2. Description of the Related Art

The continuing proliferation of faster and more powerful computers has been accompanied by an increase in the use of graphical user interfaces. A graphical user interface (or, GUI) offers many advantages over traditional text-based interfaces. A graphical interface may allow multiple application programs to present output simultaneously, each in a distinct window. Thus, it is not necessary to halt one application in order to interact with another. Instead of entering text-based commands and parameters, the user selects icons with a pointing device, such as a mouse. This is faster, easier and less error prone than making these selections using the keyboard.

The development of object-oriented programming languages has accompanied the increased popularity of GUIs. Modern object-oriented programming languages can often be written and developed in a relatively short period of time. Object-oriented programming languages represent a new paradigm for software design. The object-oriented paradigm has arisen to enable faster development of complex software programs. It encourages the use of consistent interfaces between program modules, and is conducive to the creation of reusable, modular code. These features are highly advantageous in the creation of large, intricate software programs, requiring the coordinated effort of several programmers, and are particularly effective for GUI development.

Computer programs have traditionally been structured as a sequence of operations, which implements an algorithm or procedure. However, the object-oriented paradigm is based on objects, rather than procedures. The fundamental entities in an object-oriented programming ("OOP") language are classes created by the programmer, which possess properties appropriate for their intended purpose. Once a class has been defined, one or more objects can be created as instances of the class. Individual objects possess all the attributes of the class they represent. For example, a software program for managing the inventory of a hardware store might contain objects such as nuts, bolts, screws, etc. having properties such as size, thread pattern, price, etc. In addition to their properties, objects also have methods. Methods are actions supported by the object, by means of which they interact with other objects or respond to external events. A major difference between OOP languages and traditional procedural program languages is that the methods and properties of an object are encapsulated. In object-oriented programming, encapsulation refers to the inclusion within an object of all the resources needed for the object to function—basically, the method and the properties. Other objects adhere to these interfaces to use the object without having to be concerned with how the object accomplishes it. This makes it easier to ensure that objects interface with one another in a consistent manner, and also protects the internal data of the object from unintentional corruption by other program elements. When an object is created, certain of its properties and methods are defined as "public," and the remaining ones as "private." Only the public properties and methods are accessible to other objects; the private properties and methods are protected.

Another feature of object-oriented programming languages that benefits code reusability is inheritance. The concept of inheritance is that certain classes or objects can inherit the properties and methods of a parent class or object. Thus, objects of code can be developed as modular building-blocks, with subsequent objects being children of parent objects. For example, a parent object when executed by a processor may produce an image indicative of an entire window and when executing a child object, the child object produces a sub-window, or template, within the parent object-executed window, or image. Importantly, the parent object can define a class, and the child object can inherit the class (properties and methods) of the parent object. In addition, the child object can also take on further methods and properties unique to the child object class. For example, a "jet" class can be defined as a child of an existing "airplane" class, with added properties, such as "turbine velocity." Once the subclass exists, the programmer is free to create new objects with jet-like properties.

Some objects have a graphical representation. For example, it is common to include buttons, checkboxes, and other similar "controls" in a GUI belonging to an application program. Images associated with these objects are displayed on a computer screen to allow the user to interact with the application. Among the methods of such objects are display methods (e.g., "paintIcon"), which can be invoked to cause a graphical representation of the object to appear on the computer screen. To permit a user to interact with the GUI, displayable controls typically include methods enabling them to respond to external events, such as mouse button clicks. The object code that is the recipient of a user event (e.g., a pointer device placed over a button displayed on a computer display) is referred to as the target object. Thus, a target object can receive method-type code imparted to it when a user interacts with the GUI.

Java is a modem OOP language, based on an extensible hierarchy of classes. A given class within the hierarchy is deemed a parent to the classes beneath it, and a child of those above it. Classes inherit methods and properties from their parent class, and pass them on to their children. Child classes typically have additional methods and properties, beyond those of their parent. Java application programs create objects by instantiating classes, and interact with these objects via their methods and properties.

Java was designed with an emphasis on portability. As used herein, the term "platform" refers to a specific combination of hardware and operating system. More specifically, a platform consists of an operating system, the computer system's coordinating program, which in turn is built on the instruction set for a processor or microprocessor, the hardware that performs logic operations and manages data movement in the computer. A software program is said to be "portable" across various platforms if the program can run without modification on any of those platforms. This "write once—run anywhere" principle is the underlying philosophy behind OOP languages such as Java.

The portability of Java depends on the presence of a Java virtual machine (JVM) in the target computer (i.e., the computer on which the Java application is to execute). A JVM "translates" the generic Java code into instructions specific to the target machine (i.e., "native" code) at runtime. Therefore, the same Java program can run without modification on any computer for which a JVM exists.

Since its introduction, Java has found use in many areas, including GUI development, where the portability of Java code is highly advantageous. As used herein, the "look and feel" of a GUI refers to such things as the appearance, color and behavior of Buttons, TextFields, Listboxes, menus, etc. and their mouse, keyboard handling and behavior. Look and feel is the generic way in which to describe the appearance of an image on a computer display to that of another image on a computer display. If the window, icons contained within the window, the control menu, the general layout of that window, and the colors of the various features shown on that window are similar to that of another window image, then the two images are said to have essentially the same look and feel.

Often, a software program is intended to run on various machines, or under various operating systems, while maintaining a consistent look and feel. If the GUI is written in Java, a great deal of the code can be common across platforms, since Java is portable. The use of common code shortens development time, since the developer only has to write one version of the GUI code to be ported to all of the desired target machines or operating systems. It also improves maintainability of the code. When bug fixes or feature upgrades are necessary, they are confined to one version of the code, rather than several machine/system-specific versions.

Unfortunately, the portability of Java does not guarantee a completely consistent, platform independent look and feel for a Java-based GUI. This is because the GUI still derives some of the look and feel of the platform through its reliance on an application program interface ("API"). An API is an interface used by an application program to access operating system services. Therefore, API is an interface between the application program and the operating system, or platform. By making calls to the API, an application program can invoke the resources of the operating system, for example, to write to the computer screen or detect the position of the mouse cursor, or to request the current look and feel settings. Traditionally, Java applications utilize an API known as the abstract windowing toolkit ("AWT").

Within the Java collection of classes, the AWT is represented by the following hierarchy of classes:

Within the AWT, and associated with each subclass of the Component class, are Component Peers, whose function is to provide a bridge between the portable Java code and the native (i.e., operating system specific) code that implements low level operations, such as graphics display functions and event routing, related to the GUI.

The fundamental user interface object in Java is the Component. As can be seen in the above hierarchy, the Component class includes the elements commonly associated with a GUI, such as Windows, Buttons, TextFields, etc. The functionality of the Component class can be broadly separated into appearance and behavior. The appearance of a Component is simply its graphical representation, when presented on a display device, such as a monitor screen. The behavior of a Component, on the other hand, relates to how the Component responds to user-driven events, such as clicking a mouse button when the cursor is positioned over the display area corresponding to the Component. Ultimately, both the appearance and the behavior of a Component are dependent on the AWT, since the AWT invokes the resources of the operating system to create a graphical representation for the Component and to properly route events related to the Component.

Ideally, the look and feel of objects created from the Component class (or any of its subclasses) in a Java application should be independent of the platform under which the application is running—i.e., the look and feel should be portable. But, as described above, the operating system environment is clearly a factor in both the appearance and behavior of these objects. A bridge between the platform independent objects and their platform dependent low-level implementation is provided by Component Peers.

Figure 1A:
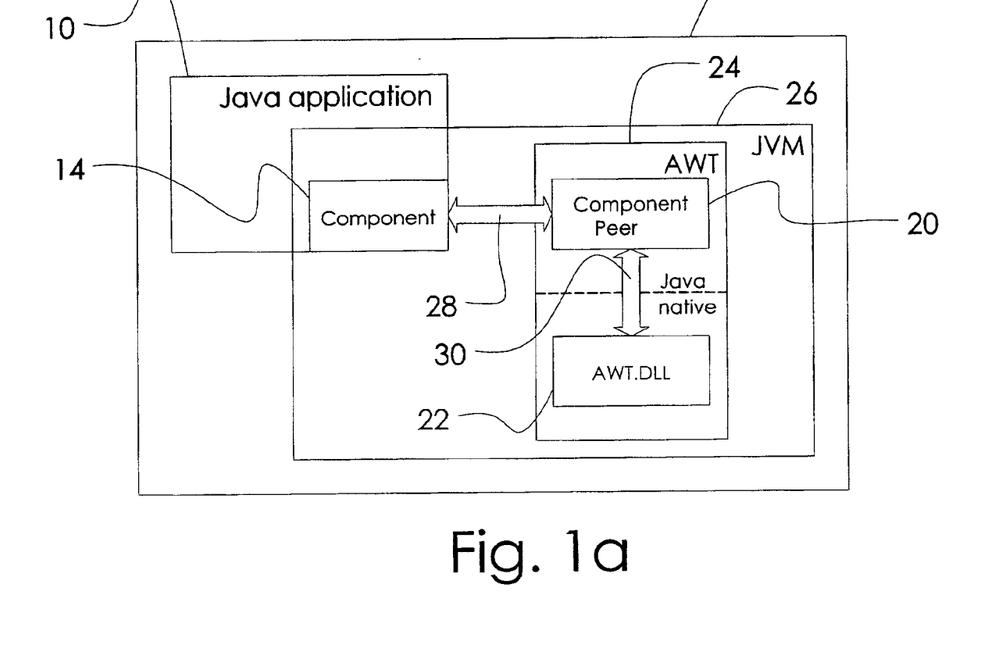
FIGS. 1a and 1b contain a diagram illustrating a function of the Peer layer.
Figure 1B:
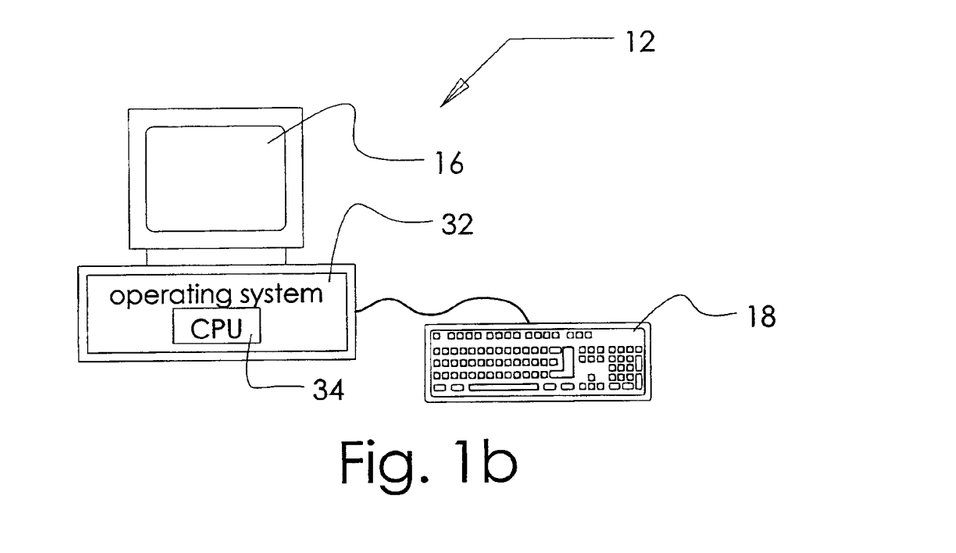

A Peer is a type of software interface, represented in FIG. 1a. In this example, a Java application 10 is running within an operating environment 12. As shown in FIG. 1b, the operating environment is a computer system, containing a processor 34 and operating system 32, along with supporting hardware, such as a display device 16 and keyboard 18. Referring again to FIG. 1a, the application calls a method of a Component 14 that requires services specific to the operating environment. For example, the application 10 may interact with a user, which requires that it display a graphical representation of the Component 14. This is accomplished through the Component Peer 20, which is specifically designed to function within the operating environment 12 to provide the appearance and implement the behavior of Component 14. For example, to display the Component 14, the Java application 10 might employ a statement such as:

Component.setVisible(True);

Note that this statement makes no reference to the graphics hardware in the computer, or any other specific features of the operating environment. These details are taken care of by the Component Peer 20. The Component Peer contains the native code instructions to display a graphical representation of the Component 14, using the specific graphics hardware and display device present in the operating environment. Whereas the Java statement is generic, and would be the same regardless of the operating environment within which application 10 is running, the corresponding Component Peer 20 is intimately connected with the operating environment through a library of operating system services, AWT-.DLL 22. If the Java application 10 were ported to a different platform, the Peer 20 would have to be changed. Thus, it is convenient to think of the Peer mechanism as a software layer, providing a platform independent Application Interface 28, and a Host Platform Interface (HPI) 30 specific to the operating environment. The HPI 30 represents a boundary between platform independent Java code and the native code that invokes the low level services of the operating system. The Peer layer is part of the AWT 24 within the JVM 26.

Peers are organized according to a class hierarchy, paralleling the AWT class hierarchy shown above, from the Component level down. Thus, there is a ComponentPeer class, which is sub-classed by the ButtonPeer, CanvasPeer, etc. Peer classes. Consequently, whenever an object is created as an instance of one of the Component classes or sub-classes, it has a counterpart Peer object.

Unfortunately, the Peer mechanism does not completely fulfill the goal of platform independence. Discrepancies in the HPI 30 exist between AWT versions intended for the various operating systems. These deviations result in variations in the appearance and behavior of the Java Components when an application is ported between platforms—in other words, look and feel inconsistency. Furthermore, the diverse implementations of the HPI 30 often contain quite different instruction sequences. These disparate codebases compound the difficulty for software developers of maintaining and enhancing the AWT.

Currently, IBM Java products require the following distinct AWT codebases:

sun.awt sun.awt.windows sun.awt.motif sun.awt.os2 com.ibm.ibm4690

These five separate implementations of the AWT share a great deal of the functionality of the Peer layer. However, the discrepancies in the native code implementation of the HPI set them apart and result in a unique set of Peer objects for each implementation. From the standpoint of look and feel consistency, as well as the software maintenance effort, it would be advantageous to be able to combine these distinct (but similar) codebases into a single generic AWT, consisting of a common set of Component Peers and a uniform HPI, allowing the generic AWT to be ported without modification to any supported platform.

SUMMARY OF THE INVENTION

The problems outlined above are in large part solved by a system, method, and computer-readable media for a standardized Host Platform Interface (HPI) for some of the Component Peer classes within the Java abstract windowing toolkit (AWT), and the use of this HPI to create a common set of Component Peers, which may be ported without modification to any supported platform.

The source code definition of a Component Peer may be written in both Java and C/C++. The C/C++ portion appears in the form of native methods, which are external C/C++ functions, called from within the Java code. These functions interact directly with the operating system to perform operations such as low-level graphics, file transfers, event routing, etc. The platform dependence of the Component Peers is largely the result of different implementations of the native methods. Although their functionality is similar between one version and another, the native methods for each platform have been independently developed, and are therefore inconsistent.

A system is disclosed herein whereby the native methods are standardized. Since the native methods bridge the platform independent code and the resources of the operating system, they collectively define a host platform interface (HPI). By adopting a common HPI, the Component Peers for each operating system would be derived from a single set of source code. Accordingly, not only would the Java source code in the definition of a Component Peer be the same, but the same C/C++ function would serve as its native method in each version. When the source code for a Component Peer is compiled, the C/C++ compiler targets a specific platform. Thus, the object code for the native method preserves the platform dependence of the Peer.

A method is also disclosed herein, according to which the native methods called by members of the Java AWT Component Peer class are standardized across platforms. A common HPI defines a set of native methods used by all versions of the Component Peers, replacing the methods currently employed, which are diverse and inconsistent from one platform-specific version of a Peer to another. In an embodiment of the method, a set of native functions, comprising a common HPI, is adopted for use in all versions of the Component Peer classes. This common HPI effectively eliminates any distinction between the Peers based on the intended target platform, and creates a single set of Component Peers for the Java AWT. The platform dependence of the Peer is created when the C/C++ functions implementing its native methods are compiled for the intended operating system.

A computer readable storage device is also disclosed, containing source and/or object code embodying common Java AWT Component Peer classes, containing native methods defined according to a standardized HPI, as described above.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

The need for rapid development of software programs has led to the introduction of modern object-oriented programming languages, such as C++ and Java. Because Java programs are compiled for execution on a virtual machine, they can be run without modification on any computer or under any operating system that supports a JVM. However, a Java application may not be completely portable in terms of the look and feel of its graphical interface. As noted previously, this can result from platform-specific discrepancies in the AWT. The various operating system-specific versions of the AWT contain differences in the native code that implements the Host Platform Interface (HPI) of the Peer layer. These differences influence the graphical representation and behavior of the Components used by Java programs, and make it more difficult to support and modify the non-uniform editions of the AWT code used for each operating system.

These native code differences occur in the Java Component Peers, which constitute the Peer layer between a Java application and the operating environment in which it is running. Java Component Peers may be coded using a combination of both Java and native code, with the native code accounting for the majority of the low-level operations such as memory management, low level graphics and basic input/output (I/O). The native code generally takes the form of functions coded in the C or C++ programming languages, and compiled specifically for the target platform. These functions are typically called from the Java code within the Peer. Collectively, the native code within the Component Peers constitutes the HPI for a given platform.

Unfortunately, there may be little uniformity in the HPI between different platforms. Thus, the C/C++ function called by a Peer to perform a given operation on one platform may be very different from the corresponding function written for another platform. These differences may even extend to the function name, or calling conventions (function name, number and type of arguments passed, etc.). Historically, the differences in the HPI occurred because the AWTs for the different platforms were developed independently. The Application Interface (item 28 in FIG. 1) of the Peer layer was required to behave consistently, to enable Java applications to use the AWT on various platforms without modification. However, no such consistency was enforced in the development of the HPI (item 30 in FIG. 1). Consequently, developers adopted divergent implementations.

A system and method are disclosed herein, whereby a common code base is created for the essential native functions required by the Component Peers. This common codebase makes possible a generic HPI, having a uniform interface on the operating environment side (as well as the application side) of the Peer layer. As a direct result, the Component Peers themselves can become platform independent, since even their native code portions can now be ported without modification across platforms. Moreover, the existence of a complete set of common (across platforms) Component Peers allows the creation of a single platform independent AWT, replacing the multiple platform specific AWTs currently in use.

The Java Native Method Interface (JNI) defines a convention for calling functions coded in languages other than Java from within a Java application. This makes it possible to add methods to Java objects and classes that call native code C/C++ functions. These functions bypass the JVM, directly invoking operating system resources for such things as graphics and event routing. The simple Java program below illustrates the use of native methods:

```
class HelloWorld {
        public native void displayHelloWorld( );
        static {
                System.loadLibrary("hello");
        }
        public static void main(String [ ] args) {
                new HelloWorld( ).displayHelloWorld( );
        }
}
```

This Java program creates a class, HelloWorld, which has a single native method, displayHelloWorld( ), declared in the second line of the program. The native method corresponds to an elementary C program that prints the message, "Hello, World" on the designated display device used by the operating system. This C program is compiled for the operating environment in which the above Java program will be executed, and the result placed in the library file, "hello", which is loaded in the fourth line of the Java program. Finally, a main method of the HelloWorld class is defined on the sixth line of the program, which declares a new instance of the class (on the seventh line) and simultaneously invokes its native displayHelloWorld( ) method, causing the operating system to display the "Hello, World" message on the screen of the display device.

Figure 2:
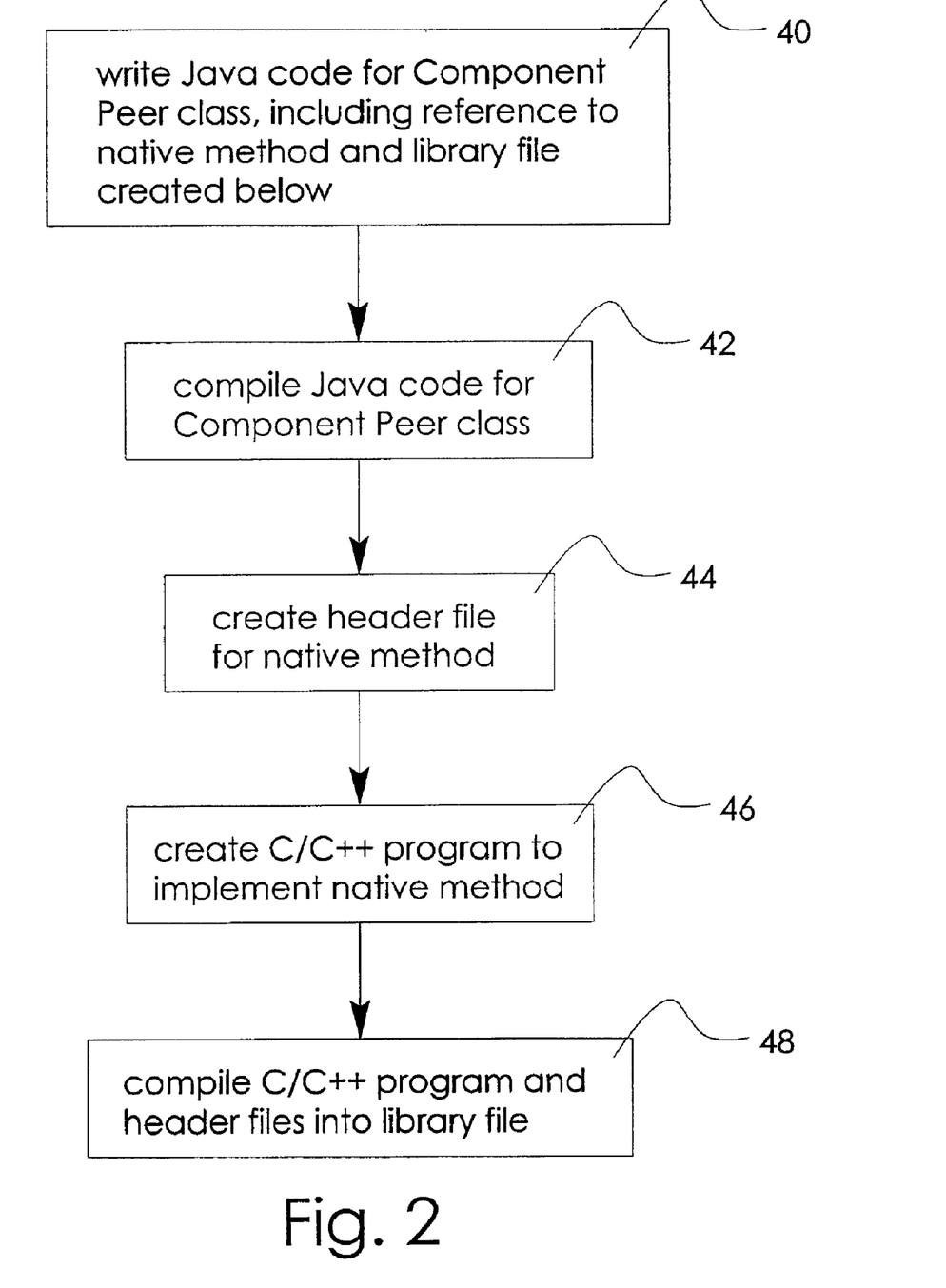
FIG. 2 presents a flowchart with the sequence of steps required to implement a native method in a Java class.

Of course, the Java AWT Component Peer classes are considerably more complicated than the program in the previous example. However, their native methods are implemented in the same manner. FIG. 2 illustrates the process by which a Peer class containing a native method is created and compiled. The first step 40 consists of writing the Java code defining the class, along with its properties and methods. Within this code must be a declaration of the native method, including any arguments passed to the method and the data type returned (if any) by the method. The name of the library in which the native method can be found must also be included, as well as a call to load this library at runtime. The Java code is then compiled 42, using the Java compiler. The output of the Java compiler is a Java byte code file, executable by a JVM and containing references to an external function (the native method) and a library in which to find that function. Next, a header file is created 44. The header file defines a "signature" for the native method, used by the JNI to call the C function that implements the method. The C/C++ function itself is then written 46. Finally, the C/C++ function and its associated header file are compiled together 48 into the library referenced by the Java code for the Peer class (in the first step). During runtime, standard non-native methods of the Peer class are implemented by the JVM, but native methods invoke the associated C/C++ function, bypassing the JVM.

The function that implements the native method interacts directly with the operating system to perform low-level, platform dependent operations. In the simple Java program described above, for example, a C function was called as a native method of the HelloWorld class. Within the C program, the following statement invoked the I/O resources of the operating system to present the "Hello, World" message on the display device:

printf("Hello, World");

C is a compiled language. In other words, a C program is a sequence of readable statements that is translated by a compiler into instructions specific to a particular processor or operating system. The readable form is referred to as "source" code, and is generally portable across platforms. The output of the compiler is referred to as "object" code, and is specific to a particular operating environment. Consequently, the source code for the C program implementing a native method (such as the displayHelloWorld method) would not have to change in order to run on a different computer, or with a different operating system. However, when the source code is compiled, it is translated into an instruction sequence specific to a particular platform. This sequence cannot generally be executed on a different computer, or with a different operating system.

Note that a Peer class, defined according to the procedure outlined in FIG. 2, can be completely portable. Since the class definition contains both Java and C/C++ source code, it is platform independent prior to being compiled. When a version of the AWT is created for a specific operating system, the Peer classes containing native methods can be generated according to the above procedure. As the source files comprising these classes are compiled, the C/C++ functions that implement their native methods are rendered into platform specific object code by the C/C++ compiler (the compiled Java code remains platform independent). The AWT is then built by linking together the Java and C/C++ object code for all of the classes.

Figure 3:
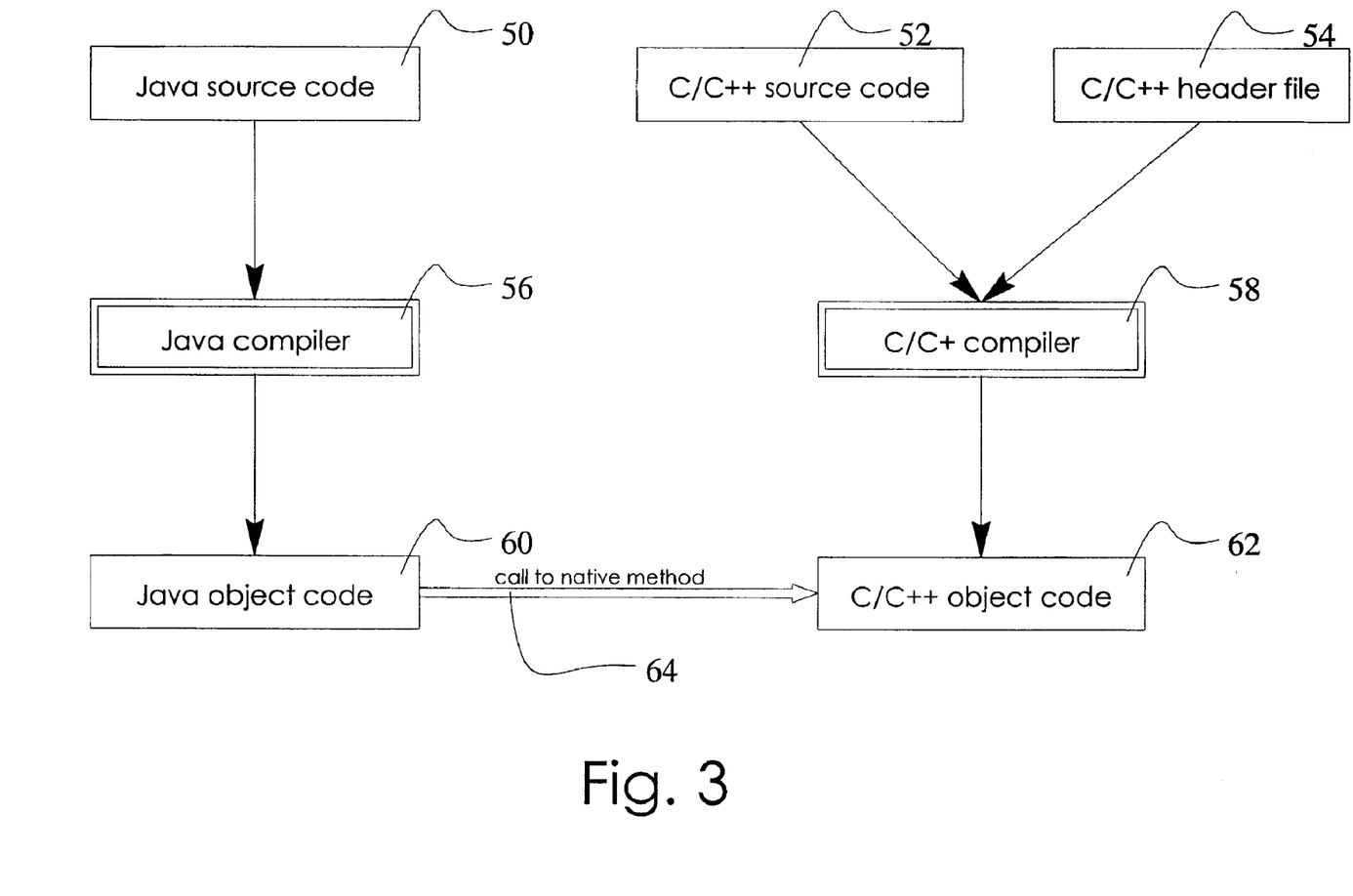
FIG. 3 represents the relationship between the source and object code files in the definition of a Peer class employing a native method.

FIG. 3 represents the relationship between the source and object code files in the definition of a Peer class employing a native method. In FIG. 3, the elements of the process depicted in FIG. 2 are explicitly shown. The Java source code 50 defines the Peer class, including declarations of the methods and properties of the class. Within this Java source code is a declaration of a native method and a call to this method. (Note that the creation of the Java source code 50 is represented in step 40 of FIG. 2.) The native method itself is implemented as a function defined in the C/C++ source code 52. The C/C++ source code contains the necessary instructions to invoke platform dependent actions from the operating system. Such instructions might include, for example, a call to get the current time from the system clock. Along with the C/C+ source file 52, a header file 54 is required. The header file 54 establishes a necessary connection between the Java Peer class and the native function defined by source code 52, allowing the function to be called by the Peer. (The creation of C/C++ source file 52 and header file 54 are represented by steps 46 and 44, respectively, in FIG. 2.) The Java source code is compiled by a Java compiler 56 to produce Java object code 60. Similarly, the C/C++ source code 52, together with an associated header file 54, is compiled by a C/C++ compiler 58 to yield C/C++ object code 62. (These operations appear as steps 42 and 48, respectively, in FIG. 2.) The Java object code 60 is platform independent—that is, it will run without modification in any operating environment containing a JVM. On the other hand, the C/C++ object code 62 is platform dependent. The C/C++ compiler 58 targets a particular operating environment and produces object code suitable for execution only within that environment. During runtime, the Java object code 60 makes a call 64 to the native method, which is handled by the C/C++ object code 62.

From the foregoing, it should be apparent that to eliminate the platform specific discrepancies between different versions of a Peer associated with each of the various AWTs, it is necessary to adopt a set of common native methods, shared by all versions of the Peer. Although the common native methods would continue to employ the resources of the particular operating system, such things as function names, calling conventions, returned results could be standardized. This standardization would allow the same source code to be used in building each AWT.

There are numerous sub-classes of the Component class, each with a corresponding Component Peer class. The effort required to develop common platform-neutral native code for each descendent of the Component Peer class would be enormous. Fortunately, it is not necessary to replace the native code in every one of the Component Peer classes in the AWT.

Most of the functionality of the AWT classes has been captured in a second-generation API known as Swing, which has a significant advantage over the AWT—Swing is written entirely in Java, and does not rely on native code. The reliance on native code is often characterized by describing the AWT controls (i.e., buttons, checkboxes, menubars, etc.) as "heavyweight". In contrast, the controls of the Swing API are "lightweight". Using a class of proxy objects, methods and events associated with the AWT controls may be redirected to analogous Swing components. By so doing, it is possible to replace most of the heavyweight AWT controls used by an AWT-based GUI in a legacy Java application with their lightweight Swing counterparts. Moreover, the replacement is done in a manner that is completely transparent to the application—i.e., the application need not be modified. Using the above-described techniques, the only Component classes of the AWT that need to remain heavyweight are Frame, Window and Dialog and their sub-classes.

For the remaining Peer classes, a minimum set of common native methods is required to implement uniform low-level functionality across multiple platforms. This set of common native methods constitutes a generic Host Platform Interface, and makes possible a single codebase for the Peers. Those common AWT Peers can be ported without modification to any supported version of the AWT, simply by compiling the native code functions for the desired platform when the AWT is built. In an embodiment of the system and method disclosed herein, the minimum set of native methods fall into several categories:

1. Configuration
2. Graphics
3. Windowing
4. Printing
5. Clipboard
6. Drag and Drop
7. Robot
8. Cursor
9. Desktop Properties
10. Input Methods The function declarations for the native methods, organized according to the above categories, appears below:

1. Configuration
    public native int getNumScreens( );                             // how many screens
    public native ColorModel makeColorModel (int screen);           // color model
    public native Rectangle getScreenBounds(int screen);            // screen size
    public native int getMaxPixelFormats(int screen);               // referred to as max configs in
                                                                    current code
    public native int qetDefaultPixelFormat( );                     // what's the default pixel format
    public native boolean isPixelFormatSupported(int screen, int fmtinx);    // pixel format supported
    public native void resetComponentGC(Component c);               // reset when display
                                                                    mode changes
    public native void resetPeerGC(COmDOnentPeer D);                // reset when display
                                                                    mode changes
2. Graphics
    public native void drawChars (char[ ] srcData, int srcOffset, int length, float x, float y, Font f,
            double[ ] matrix, int fgClr, int cx, int cy, int cw, int ch, ImageData dest);
    public native void drawString (String srcData, float x, float y, Font f, double [ ] matrix, int fgClr,
            int cx, int cy, int cy, int ch, ImageData dest);
    public native void drawBytes (byte[ ] srcData, int srcOffset, int length, float x, float y, Font f,
            double[ ] matrix, int fgClr, int cx, int cy, int cw, int ch, ImageData dest);
    public native void drawGlyphVector(int[ ] srcGlyphs, float[ ] posXY, float x, float y, Font f,
            double [ ] glyphTX, double devTX, int fgClr, int cx, int cy, int cw, int ch,
            ImageData);
    public native void drawText (String s, int x, int y, Font f);
    public native int stringWidth(Font f, String str);
    public native int charWidth(Font f, char[ ] data, int off, int len);
    public native int bytesWidth(Font f, bytes[ ] data, int off, int len);
    public native boolean canDisplay(char c);
    public native void createFromComponent (ComponentPeer);
    public native void createFromGraphics (Graphics g);
    public native void createFromPrintJob (PrintControl pg. PrintJob pj);
    public native void createFromHDC (int hdc);
    public native void dispose( ); public native static void init( );
    public native void setFont(Font f);
    public native void setForeground(Color c);
    public native void setPrinting (boolean b);
    public native void setOrigin (int x, int y);
    public native void setPaintMode( );
    public native void setXORMode(Color c);
    nljblic native void setLineAttrs (int w, int linecap, int linejoin,
                byte[ ] dashes, int numdashes, int dashoff);
    public native void changeClip(int x, int y, int w, int h, boolean set);
    public native void removeClip( );
    public native void devClearRect(int x, int y, int w, int h);
    public native void devFillRect(int x, int y, int w, int h);
    public native void devDrawRect(int x, int y, int w, int h);
    public native void devDrawLine(int x, int y, int x2, int y2);
    public native void devCopyArea(int x, int y, int w, int h, int dx, int cy);
    public native void devDrawRoundRect (int x, int y, int w, int h, int arcw, int arch);
    public native void devFillRoundRect (int x, int y, int w, int h, int arcw, int arch);
    public native void devDrawPolyline (int xPoints[ ], int yPoints[ ], int npoints);
    public native void devDrawPolygon(int xPoints[ ], int yPointst], int npoints);
    public native void devFillPolygon(int xPoints[l, int yPoints[ ], int npoints, boolean evenodd);
    public native void devFillSpans(Spaniterator si, long iterator);
    public native void devDrawOval(int x, int y, int w, int h);
    public native void devFillOval(int x, inty, int w, int y);
    public native void devDrawArc(int x, int y, int w, int h, int startAngle, int endAngle);
    public native void devFillArc(int x, int y, int w, int h, int startAngle, int endAngle);
    public native void devPrint(ComponentPeer);
    public native int devLockViewResource(ImageData id, int x, int y, int w, int h, int lockflags);
    public native int devUnLockViewResources~ImageData id);
    public native int devGetMonoImageData(ImageData id);        // allows 1 bpp remote X
                                                                support for text performance
    public native int devPutMonoImageData(ImageData id);
3. Windowing
    // components
    public native GraphicsConfiguration getGraphicsConfiguration( );
    public native void dispose( );
    public native void init( );
    public native void show( );
    public native void hide( );
    public native void enable( );
    public native void disable( );
    public native void showCursor( );
    public native void setCursor( );
    public native void reshape (int x, int y, int width, int height);
    public native Point getLocationOnScreen( );
    public native void handleEvent(AWTEvent e);

-continued

```
    public native void requestFocus( );
    public native void startProcessingEvents( );
    public native void beginValidate( );                    // defer window positioning
    public native void endValidate( );
    public native int addDropTarget(DropTarget dt);
    public native void removeDropTarget(DropTarget dt);
// standard callbacks
    private reportEvent (AWTEvent e);                       // mouse keyboard resize
    private reportExpose(int x, int y, int w, int h);
    private reportPaint(int x, int y, int w, int h);
//dialog
    public int createDialog(ComponentPeer parent);
    public void showModal( );
    public void endModal( );
//embedded frame
    public int createEmbeddedFrame(ComponentPeer parent);
    public void pushModality( );
    public void popModality( );
    //frame
    public int createFrame(ComponentPeer parent);
    public native void setMenuBarSize(int h);               //for inset calculations
    public native void seticonimageBits(byte[ ] src, byte[ ] mask, int scanstride, int h, int w);
    public native Dimension getDefaulticonSize( );
    public native void setIMMMenuOption(String s);
    public native void setTitie(String s);
    public native void setState(int state);
    //iconify/minimize/maximize/restore
    public native int getState( );
    public native void setResizable( );
//window
    public int createWindow(ComponentPeer parent);
    public native void updateWindow( );
    public native int[ ] createPrintedPixels(int x, int y, int w, int h);     // allows banding while
printing
    public native DrawingSurfaceInfo getDrawingSurfaceInfo( );
    public native void toBack( );
    public native void toFront( );
    public native Insets getinsets( );
// Toolkit
    public native void initToolkit( );
    public native void eventLoop( );
    public native void shutdown( );
    public native void disposeToolkit( );
    public native void startSecondaryEventLoop( );
    public native void endSecondaryEventLoop( );
    public native ColorModel makeColorModel( );
    public native int getScreenResolution( );
    public native Dimension getScreenSize( );
    public native void sync( );
    public native void beep( );
    public native boolean getLockingKeyState(int key);
    public native void setLockingKeyState(int key, boolean on);
    public native int getMaxCursorColors( );
    public void add(Component c, int handle);
    public void remove(Component c);
    public void int find(Component c);
    public void Component find(int i);
    public void Component findAt(int x, int y);       // heavyweight
4) Printing
    // print control
    public native String[ ] getPrinterList( );
    public native boolean getCapabilities(PrinterCapabilities caps);
    public native String getDefaultPrinter( );
    public native char getMediaAttribute(String printer, int index);
    // printerjob
    public native void getDefaultPage( );
    public native void validatePaper(Paper origPaper, Paper newPaper);
    public native void pageSetup(PageFormat page, Printable painter);
    public native void jobSetup(Pageable doc, PageFormat page, boolean allowPrintToFile);
    public native void initPrinter( );
    public native void startDoc( );
    public native void endDoc( );
    public native void abortDoc( );
    public native void deleteDoc( );
    public native void startPage(PageFormat page, Printable painter, int index);
    public native void endPage(PageFormat page, Printable painter, int index);
    public native void printBand(byte[ ]data, int x, int y, int w, int h);
    public native void beginPath(int printdc);
    public native void endPath(int printdc);
```

-continued

```
    public native void closeFigure(int printdc);
    public native void fillPath(int printdc);
    public native void moveTo(int printdc, float x, float y);
    public native void lineTo(int printdc, float x, float y);
    public native void polyBezierTo(int printdc, float, float, float, float, float, float);
    public native void setPolyFillMode(int printdc, int fillrule);
    public native void setColor(int printdc, Color c);
    public native Point getPosition(int printdc);
    public native void selectClipPath(int printdc);
    public native void setLogicalFont(int printdc, Font f, int rotation);
  public native void setFont(int printdc, String familyName, float size, boolean bold,
    boolean italic, int rotation);
    public native void setTextColor(int printdc, Color c);
    public native void drawString(String s, float x, float y, Font f);
    public native void drawimage (int printdc, int[ ] image float x, float y, float w, float h, float
srcx,
            float srcy, float srcw, float srcy, int srcBitmapWidth, int srcBitmapHeight);
    // printjob
    public native void newPage( );
    public native void flushPage( );
    public native void end( );
5) Clipboard
    public native void initClipboard( );
    public native void setClipboardText(StringSelection ss);
    public native String getClipboardText( );
    // callback
    private void lostOwnership( );
6) Drag&Drop
    //source
    public native int createDragSource(ComponentPeer p, InputEvent trigger, int actions,
        Object[ ] types, Cursor c);
    public native void doDragDrop(int nativeContext, Cursor c);
    public native void setNativeCursor (int nativeContext, Cursor c);
    public native void release(int nativeContext);
    public native void setActions(int nativeContext, int actions);
    //target
    public native Object getData(int nativeContext, String atom);
    public native void dropDone(int nativeContext, int actions);
    public native void keepAlive(int nativeContext);
    private reportDragEvents (Component c, int x, int y, int dropaction, int actions, String[ ]
atom,
                int nativeContext);
7) Robot
    public native void dispose( );
    public native void createRobot(GraphicsDevice gd);
    public native void mouseMove(int x, int y);
    public native void mousePress(int buttons);
    public native void mouseRelease(int buttons);
    public native void keyPress(int keycode);
    public native void keyRelease(int keycode);
    public native Color getPixel(int x, int y);
    public native void getRGBPixels(int x, int y, int w, int h, int pixArray[ ]);
8) Cursor
    public native void createCursorIndirect (int[ ] rdata, byte[ ] mask, int w, int y, int hotx, int
hoty);
    public native void setCursor(Cursor c, boolean u);
    public native Point getCursorPosition( );
    public native Dimension getDefaultCursorSize( );
9) Desktop Properties
    public native initDesktopProperties(Properties d);
10) InputMethod
    public native Locale[ ] getNativeLocalesAvailable( );
    public native int createIMEContext( );                  /* openXIM, createXIC*/
    public native void destroy (int ic);                    /* disposeXIC, closeXIM */
  public native void enable (ComponentPeer peer, int ic, boolean useNativeCompWindow); /*
            reconfigure, setfocus */
    public native void disable (ComponentPeer peer, int ic);    /* resetXIC */
    public native void handleEvent(ComponentPeer peer, AWTEvent e);
    public native void endComposition(int ic, boolean flag);
    public native void setCompositionStatus(int ic, int convmode);
    public native int getCompositionStatus(int ic);
    public native Locale getNativeLocale(String localeName, boolean onActivate);
    public native boolean setNativeLocale(String LocaleName, boolean onActivate);
    public native void showCompositionWindow(ComponentPeer focusedPeer);
    public native void hideCompositionWindow(ComponentPeer focusedPeer);
```

In the present embodiment, these native methods would be written as C/C++ functions and compiled for a specific platform (as is the current practice). However, the source code for any given function would now be the same, regardless of which platform it was targeted for.

Hardware specific differences in the code (e.g., the amount of memory in the host computer) are addressable by conditional compilation of the C/C++ function code. Using conditional compilation, particular portions of the source code can be selected for compilation dependent on the status of compiler settings. Conditional compilation allows the compiler to optimize the object code for the current platform, without having to maintain separate versions of the source code. Thus, a single codebase can be employed for all versions of the AWT heavyweight Peers, by adhering to a common set of native methods embodied in a generic HPI.

The native methods disclosed herein are sufficient to create a common HPI. A single set of Component Peer classes could thus be used for every supported platform. This would eliminate the need for multiple dissimilar AWT codebases, and greatly reduce the difficulty of software support and maintenance.

It will be appreciated by those skilled in the art having the benefit of this disclosure that this invention is believed to present a basis for the creation of a common set of Component Peer classes, employing native methods adhering to a standardized HPI. Further modifications and alternative embodiments of various aspects of the invention will be apparent to those skilled in the art in view of this description. Such details as the exact definitions and specific code within the set of native methods as described herein are exemplary of a particular embodiment. It is intended that the following claims be interpreted to embrace all such modifications and changes and, accordingly, the specification and drawings are to be regarded in an illustrative rather than a restrictive sense.

What is claimed is:

1. A computer system, comprising:
   a runtime operating environment that comprises a computer processor and an operating system adapted to execute:
      a first object code portion containing instructions for eliciting certain actions from a Java virtual machine (JVM) associated with any of a plurality of operating environments;
      a second object code portion containing instructions for eliciting certain actions from the operating system associated with the runtime operating environment; and
   first and second source code portions, wherein the first object code portion is derived from the first source code portion, the second object code portion is derived from the second source code portion, and wherein the second source code portion is adapted to derive a third object code portion containing instructions for eliciting certain actions from a second operating environment, different from the runtime operating environment.

2. The computer system as recited in claim 1, wherein execution of the instructions contained within the first and second object code portions may be initiated by a Java application program acting within the runtime operating environment.

3. The computer system as recited in claim 1, wherein the first source code portion comprises definitions of Java abstract windowing toolkit (AWT) Component Peer classes written in the Java programming language.

4. The computer system as recited in claim 1, wherein the second source code portion comprises definitions of native methods of Java AWT Component Peer classes written in the C/C++ programming language.

5. The computer system as recited in claim 1, wherein the second object code portion comprises a host platform interface (HPI) between the AWT Component Peer classes and the runtime operating environment.

6. A method for creating an operating system independent programming interface that provides consistent presentation results across a plurality of operating systems, the method comprising:
   receiving first source code describing an operating system independent function, wherein said first source code includes an interface reference to an operating system dependent function;
   transforming said first source code into first machine executable code, said first machine executable code operable on any of a plurality of operating systems having an operating system independent virtual execution function;
   receiving second source code describing an operating system dependent function responsive to said interface reference; and
   transforming said second source code into a plurality of machine executable code modules, each of said machine executable modules operable on only one of said plurality of operating systems.

7. The method as recited in claim 6, further comprising an active Java application program acting within the a runtime operating environment to initiate execution of the instructions contained within first and second object code portions.

8. The method as recited in claim 7, further comprising defining Java AWT Component Peer classes in the first source code.

9. The method as recited in claim 8, further comprising defining a host platform interface (HPI) between the AWT Component Peer classes and the runtime operating environment in the second object code portion.

10. The method as recited in claim 6, wherein the first source code is written in the Java programming language.

11. The method as recited in claim 6, further comprising defining native methods of Java AWT Component Peer classes in the second source code.

12. The method as recited in claim 6, wherein the second source code is written in the C/C++ programming language.

13. A computer-readable storage device, comprising:
   a runtime operating environment comprising computer processor and an operating system;
   a first object code portion, containing instructions executable by the computer processor within the runtime operating environment for eliciting certain actions from a Java virtual machine (JVM) associated with the runtime operating environment;
   a second object code portion, wherein the object code contains instructions executable by the computer processor within the runtime operating environment for eliciting certain actions from the operating system within the runtime operating environment; and
   first and second source code portions, wherein the first object code portion is derived from the first source code portion, the second object code portion is derived from the second source code portion, and wherein the second source code portion is adapted to derive a third object code portion containing instructions executable by a second computer processor within a second operating environment for eliciting certain actions from said second operating environment, wherein the second operating environment is different from the runtime operating environment.

14. The computer-readable storage device as recited in claim 13, wherein the first source code portion comprises definitions of at least some of the Java AWT Component Peer classes.

15. The computer-readable storage device as recited in claim 13, wherein the second object code portion comprises a host platform interface (HPI) between the AWT Component Peer classes and the runtime operating environment.

* * * * *